Jan. 16, 1962 D. LABINO ETAL 3,017,318
HIGH TEMPERATURE RESISTANT SILICEOUS COMPOSITIONS
AND METHOD OF PRODUCING
Filed Nov. 2, 1956 2 Sheets-Sheet 1

INVENTORS
Dominick Labino and
BY Lawrence O. Gagin
Nobbe & Swope
ATTORNEYS

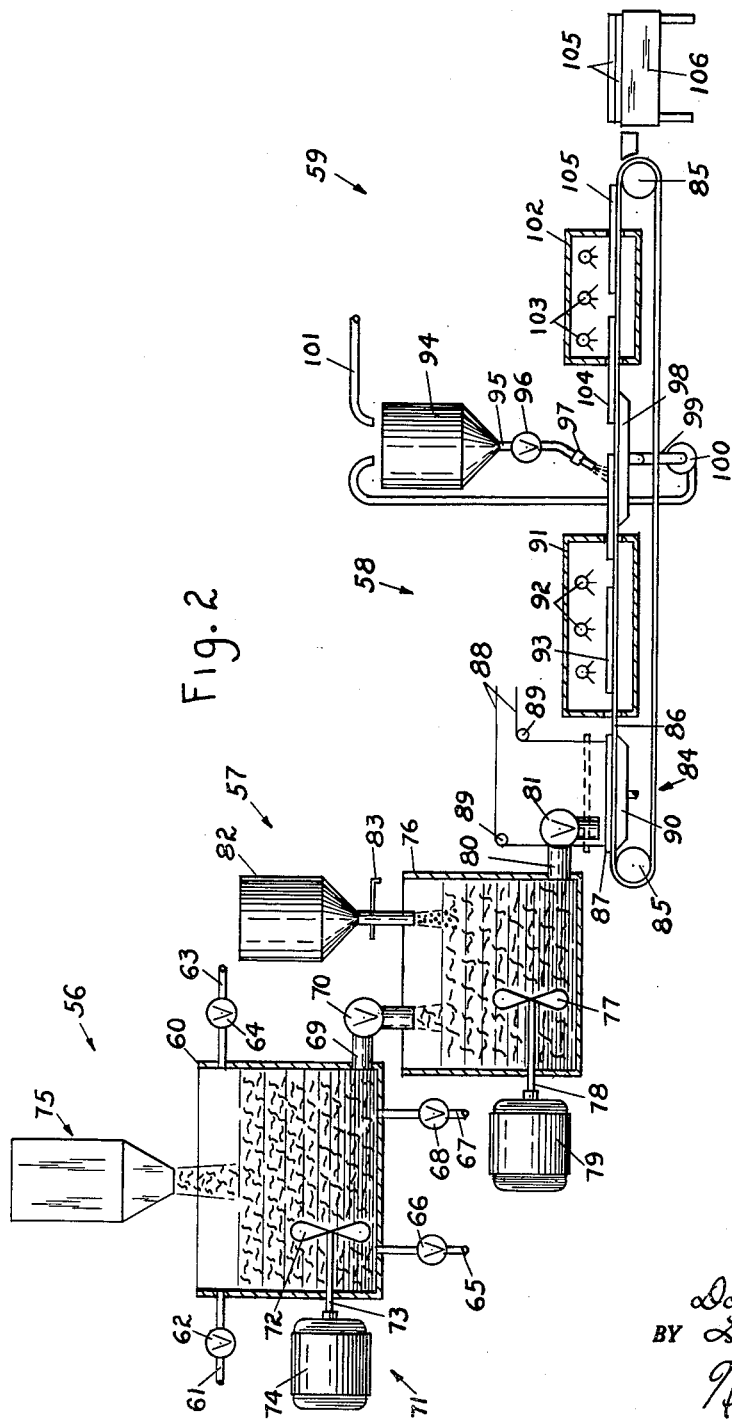

United States Patent Office 3,017,318
Patented Jan. 16, 1962

3,017,318
HIGH TEMPERATURE RESISTANT SILICEOUS
COMPOSITIONS AND METHOD OF PRODUCING
Dominick Labino, Maumee, and Lawrence V. Gagin,
Toledo, Ohio, assignors, by mesne assignments, to
Johns-Manville Fiber Glass Inc., Cleveland, Ohio, a
corporation of Delaware
Filed Nov. 2, 1956, Ser. No. 620,143
20 Claims. (Cl. 162—152)

This invention relates to siliceous articles adapted to withstand high temperatures and to a method for their production.

It has now been discovered that board-like materials of varying degrees of rigidity or stiffness can be fabricated from siliceous fibers and which board-like materials will withstand elevated temperatures as high or higher than the fusion points of the fibers included in the said board-like materials. The board-like materials of the present invention are adapted to a wide variety of uses including high temperature insulation, as core materials for casting metals, and many others.

Briefly stated the high temperature boards made in accordance with this invention are comprised of siliceous fibers such as glass, alumina, mineral wool or quartz fibers, which impart tensile strength and body to the boards; a filler such as talc, pyrophyllite, dehydrated clay, flint, feldspar, gypsum, mica or asbestos; and an inorganic bonding agent such as colloidal silica or colloidal alumina.

The method by which the board-like materials of the present invention are made includes briefly the preparation of a felt from an aqueous slurry of a selected siliceous fiber, or admixture of siliceous fibers, and a filler. The felt may then be dried to remove moisture after which there is applied to the felt an aqueous suspension of colloidal binder followed by drying to produce the board-like materials as hereinbefore described.

It is therefore the aim of this invention to provide substantially rigid siliceous articles which are adapted to withstand high temperatures, and a method for their production.

Other objects and advantages of the invention will become more apparent during the course of the following description when taken in connection with the accompanying drawings.

In the drawings, wherein like numerals are employed to designate like parts throughout the same:

FIG. 2 is an elevational side view with some parts shown in section, illustrating apparatus for processing the fibers and other materials to produce high temperature boards of the present invention.

Figure 1:
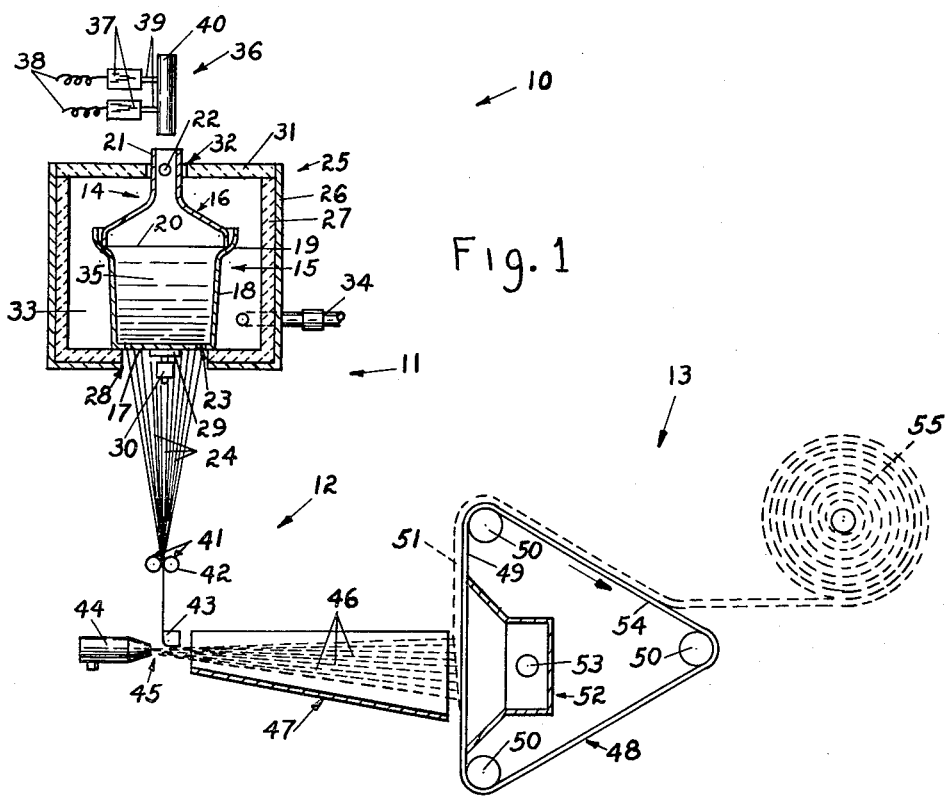
FIG. 1 is an elevational side view, with some parts shown in section, illustrating one form of apparatus for producing glass fibers which are adapted for use in the production of high temperature boards of this invention.

As shown in the drawings, and particularly in FIG. 1, the numeral 10 refers generally to an apparatus adapted to the production of very fine glass fibers. This apparatus comprises a glass melting and primary filament drawing section 11, a burner and secondary fiber attenuation section 12 and a fiber collection system 13.

The glass melting and primary filament drawing section 11 includes a melting pot 14, preferably fabricated of a refractory such as sillimanite, and having a body 15 and a cover 16 adapted to fit thereon. The body 15 includes a circular bottom 17 and a cylindrical, vertically disposed side wall 18, having its top edge flared outwardly to form a shoulder 19 to support the cover 16. The cover 16 is in the form of an inverted funnel and has a circular base 20 of a diameter adapted to mate with the shoulder 19 of the body 15 for support thereon. The top of the cover 16 terminates in a vertically disposed tube 21 through which glass making materials in the form of marbles 22 can be fed into the pot for melting. The bottom 17 of the pot 14 is provided with a plurality of small apertures 23 through which streams of glass are exuded for attenuation into primary filaments 24.

The melting pot 14 is positioned within an insulated casing 25 wherein it is adapted to be heated to glass melting temperatures by means of a burning combustible gas. The casing 25 encircles the pot and includes an outer shell 26, suitably fabricated of sheet steel and formed with an opening in the top thereof. A refractory liner 27, suitably made of fire clay, is attached to the inner surface of the shell 26 for support thereby. The bottom of the casing is provided with a circular opening 28, of slightly smaller diameter than the bottom 17 of the melting pot 14, which is adapted to be supported thereover in coaxial alignment. Clearance is provided for passage of the above-mentioned glass streams through the opening 28. A steel pad 29, supported in adjustable relation at the end of a support arm 30, which support arm is in turn secured to a suitable frame element, is positioned beneath the center of the bottom 17 of the pot 14 for supporting the same against sagging when heated to the high temperatures necessary to melt glass. The top of the casing 25 comprises a refractory plate 31 having a hole 32 therein through which the tube 21 of the cover 16 of the melting pot 14 protrudes.

An annular combustion chamber 33 is provided between the wall 18 of the melting pot 14 and the casing 25. By means of a gas conduit 34 a combustible gas mixture, such as natural gas and air, is adapted to be introduced into the combustion chamber 33 where it is burned and thereby heats the wall 18 of the melting pot 14 to glass melting temperature so that glass forming materials placed therein are transformed into a body of molten glass 35, which as previously mentioned, is exuded as small streams through the apertures 23 provided in the bottom 17 of the pot 14, for drawing into primary filaments 24.

A marble feeding device 36 is adapted to feed marbles 22 from a suitable bulk supply to the melting pot 14 at a rate at which molten glass is withdrawn therefrom. The marble feeder 36 comprises a pair of solenoids 37, supplied with electric power through lines 38. Each solenoid 37 is provided with a solenoid rod 39 which is adapted to be moved horizontally into a vertically disposed marble conduit 40. It will be seen that alternate actuation of the solenoids 37 will cause marbles 22 to be fed individually into the melting pot 14, passing thereinto through the tube 21 forming part of the top 16 of the pot 14.

A pair of horizontally disposed, coacting pull rolls 41 is positioned in vertically spaced relation beneath the bottom 17 of the melting pot 14 for drawing the aforementioned primary filaments 24. The primary filaments 24 are directed downwardly from the bottom 17 of the melting pot 14 in converging relation, and pass between the pull rolls 41, which are adapted to be rotated at synchronized speeds. The peripheral surfaces 42 of the pull rolls 41 are preferably formed of an elastomeric material which will grip the primary filaments 24 and pull them downwardly in vertically disposed and horizontally spaced relation.

From the glass melting and primary filament drawing section 11, the primary filaments 24 pass downwardly to the burner and secondary fiber attenuation section 12, which includes a suitable guide member 43 and burner 44. The guide member 43 is positioned in vertical alignment beneath the pull rolls 41. The burner 44, which is adapted to produce a high velocity and high temperature gas blast 45, is supported to direct the blast immediately beneath the guide member 43 in a horizontal manner. The aligned primary filaments 24 are directed down past the rear side of the guide member 43 and may be retained in aligned relation in vertically aligned grooves formed on said rear side of the guide member. As the primary filaments 24 move downwardly, they are directed into the blast 45 where they are melted by the heat of the blast and are attenuated into very fine fibers 46 by the velocity of the blast as is well known in the art.

From the burner and secondary fiber attenuation section 12, the fibers 46 pass horizontally to the fiber collection system 13 which includes a fiber guiding chute 47 and a fiber collection chain 48. The fiber guiding chute 47 is positioned in horizontally aligned and fiber receiving relation with the blast 45 produced by the burner 44 and is adapted to direct the fibers 46 against a vertically disposed fiber collection flight 49 of the continuous fiber gathering chain 48. The chain 48 is supported upon three rotatable rolls 50, one or more of which is adapted to be driven to move the chain 48 in the direction of the arrow across the aforementioned fiber collection flight 49. The chain 48 is of foraminous structure and is thereby adapted to pass gases, but retain fibers contained in such gases. Thus the fibers, as they are carried in and by the blast 45 of the burner 44 are admixed with large volumes of combustion gases and air. The chain 48 serves to separate the fibers 46 from the gases and air and collect the fibers in the form of a mat 51. A suction box 52 is positioned immediately behind the collection flight 49 of the chain 48 and is provided with an outlet 53 which is connected to a conduit, in turn connected to a suitable pump such as a fan, and is thereby adapted to apply a reduced atmospheric pressure to the fiber collection flight 49. Thus the suction box 52 aids in directing the blast borne fibers 46 to the collection flight 49 for forming the mat 51. The mat 51 moves upwardly with the chain 48 and around the upper chain support roll 50 and down the mat effluent flight 54 from which it is removed and gathered suitably as a roll 55.

In certain applications of the invention, such as where the boards made in accordance therewith are not to be subjected to temperatures above the fusion point of the glass fibers, it is possible to use fibers as produced by the apparatus of FIG. 1. However, where boards are to be made which are required to withstand temperatures greater than the fusion point of glass, the fibers are leached to remove metal oxides therefrom and thereby convert them to substantially pure silica, which will withstand much higher temperatures than glass.

The apparatus shown in FIG. 2 is adapted for the leaching of glass fibers to form silica fibers, as well as to the processing of glass fibers or the silica or other suitable fibers, into board-like materials of the invention. This apparatus includes a slurry and/or leaching section 56, a filler addition section 57, a felting and drying section 58 and a binder impregnating and redrying section 59.

The slurry and/or leaching section 56 includes a slurry tank 60 of corrosion resistant material. This tank 60 is provided with a water conduit 61 and valve 62 for controlling the introduction of water, an acid conduit 63 and valve 64 for regulating the introduction of a leaching acid, a waste water conduit 65 and waste water valve 66 for the removal of waste water and a waste acid conduit 67 and waste acid valve 68 for the removal of waste acid, and a slurry discharge conduit 69 and slurry discharge valve 70. The slurry tank 60 is also fitted with a mechanical agitator 71, suitably comprising a propeller-type stirrer 72 secured to the shaft 73 of motor 74. The shaft 73 is fitted through the side of the tank 60 with a suitable packing member to prevent leakage of the contents of the tank. Supported in spaced relation above the tank 60 is a container 75 adapted to hold a bulk supply of siliceous fibers, such as glass fibers produced by the apparatus of FIG. 1. Suitable feeding means is provided in the bottom of the container 75 for metering a desired amount of fibers into the tank 60.

When it is desired to prepare a slurry of unleached siliceous fibers, such as glass fibers, in the tank 60, the water valve 62 is opened and a measured amount of water introduced into the slurry tank. Then, with the mechanical stirrer 71 set in motion, a desired amount of glass fibers is metered into the water from the bulk container 75. During this operation, other valves leading into the slurry tank 60 are closed. At the end of a desired agitation period, the slurry is ready for further use.

When it is desired to prepare silica fibers for producing high temperature resistant boards, as previously mentioned, the slurry or leaching tank 60 is first provided with a dilute aqueous inorganic acid such as hydrochloric or sulfuric. This is done by opening the water valve 62 to admit a desired amount of water, then the acid valve 64 to admit a desired amount of concentrated acid which is admixed with the water by means of the mechanical stirrer 71. The other three valves of the slurry tank remain closed at this time. A desired weight of glass fibers is then metered into the aqueous acid solution from the bulk fiber container 75 and agitated in slurry form with the aqueous acid for a selected leaching time. Then the waste acid valve 68 is opened and the acid flowed from the tank. After acid removal, rinse water is introduced through the water valve 62 and by means of the mechanical stirrer 71 the fibers and water are agitated to wash the fibers. The waste water is then discharged from the tank through the waste water valve 66 after which additional rinse water is introduced through the water valve 62 and by means of the stirrer 71 a slurry is again formed.

Various types of alkali silicate glass compositions may be used to form glass fibers which are to be leached, and glass compositions of silica and sodium, silica and potassium, and silica and lithium have been successfully leached. However, best results have been obtained from alkali silicate glass compositions of between about 72% to 80% silica and about 20% of alkali metal oxide which is preferably sodium oxide. Fibers which leach very well are composed of about 71.2% silica and 21.8% sodium oxide.

The aqueous slurry, prepared by either one of the foregoing methods, is conveyed to the filler addition section 57 through the slurry discharge conduit 69. This section includes a filler mixing tank 76 which is fitted with a mechanical stirrer 77 mounted on a shaft 78 of a motor 79. The shaft 78 is inserted through the tank wall and suitably packed for retention of the liquid contents of the tank. The tank 76 is also provided with outlet conduit 80 and outlet valve 81. Positioned vertically above the tank 76 is a hopper 82 adapted to contain a bulk supply of a suitable filler such as talc, dehydrated clay or the like. The hopper 82 is fitted with a suitable metering device 83 adapted to permit filler to flow into the tank 76 in controlled amounts.

In operation, the slurry previously prepared in the slurry tank 60, is admitted into the filler mixing tank 76 by means of the slurry discharge conduit 69 and slurry discharge valve 70. The agitator 71 is turned on to keep the fibers of the slurry suspended. Then filler from the hopper 82 is fed into the slurry in a measured amount by means of the metering device 83. After a suitable agitation interval, to assure that all of the filler is thoroughly admixed with the slurry, the mixture is conveyed to the felting section 58 through the outlet conduit 80 and outlet valve 81.

The felting section 58 includes a continuous foraminous screen 84 trained about a pair of horizontally aligned rotatable rolls 85, adapted for intermittent movement to move the screen forward in increments equivalent to the length of felt desired to be made. Positioned above the felting flight 86 of the screen 84 is a felt mold 87, that comprises a rectangular form with open top and bottom which is positioned upon the upper surface of the felting flight 86 of the screen 84 to retain the slurry mixture which is deposited therein from the slurry tank 76. The mold 87 is supported at each end by a flexible line 88 which passes over a pulley 89 to a suitable hoisting motor (not shown) effective to raise and lower the mold 87 between the positions represented by the solid and broken outlines. A catch pan 90 is positioned beneath the felting flight 86 of the screen 84, in vertically aligned relation with the felting mold 87, to catch and remove water from the slurry mixture retained on the felting flight by the felting mold. Positioned in horizontally spaced relation from the catch pan 90 and in surrounding relation to the felting flight 86 of the continuous screen 84 is a drying oven 91 suitably heated such as by gas burners 92.

The felting operation is effected by lowering the mold 87 into contact with the felting flight 86. Then a mixture of fibers, filler and water, prepared in the mixing tank 76 is passed through the slurry outlet conduit 80 onto the felting flight 86 which, at this time, is stationary. The water of the mixture runs through the screen 84 and is caught and conveyed away by the catch pan 90 leaving a soft, wet felt 93 supported upon the screen. After a suitable drainage interval, the mold 87 is raised and the screen 84 is moved forward to convey the felt 93 into the drying oven 91 where the felt is retained for a suitable drying interval to partially or completely remove water therefrom, as desired.

From the felting and drying section 58, the felt is conveyed to a binder impregnation and redrying section 59 which includes a binder tank 94 adapted to contain a quantity of binder such as colloidal silica or colloidal alumina suspended in a suitable carrier such as water. The tank 94 is suitably supported in vertical spaced relation above the felting flight 86 of the screen 84. A binder conduit 95 is connected to the bottom of the binder tank 94 and is fitted with a valve 96. The conduit 95 terminates at its lower end in a spray head 97 which is positioned a short distance above the felting flight 86 for spraying binder over a felt carried thereby.

The binder is applied to the felts by means of the spray head 97 which applies the aqueous binder to the upper surface of the felts. The speed of the felt 93 is coordinated with the output of the spray head 97 to provide for the addition of a desired amount of binder to the felt. A binder catch pan 98 is positioned beneath the felting flight 86 and the spray head 97 and is adapted to recover surplus binder which passes around or through the felts 93. The catch pan 98 may be provided with a return conduit 99 which, in cooperation with a pump 100, is adapted to recycle excess binder to the supply tank 94. A make-up line 101, positioned above the supply tank 94 is adapted to replenish the supply of binder therein from a suitable binder preparation station.

The binder impregnation and redrying section 59 also includes a redrying oven 102 which, like the drying oven 91, may be heated by gas burners 103. By movement of the continuous foraminous screen 84, the felt 104 is moved forwardly into the oven 102 and dried. Upon completion of drying, which changes the felts into rigid board-like materials 105, the boards are moved forwardly to a stacking table 106 where they are collected.

Figure 3:
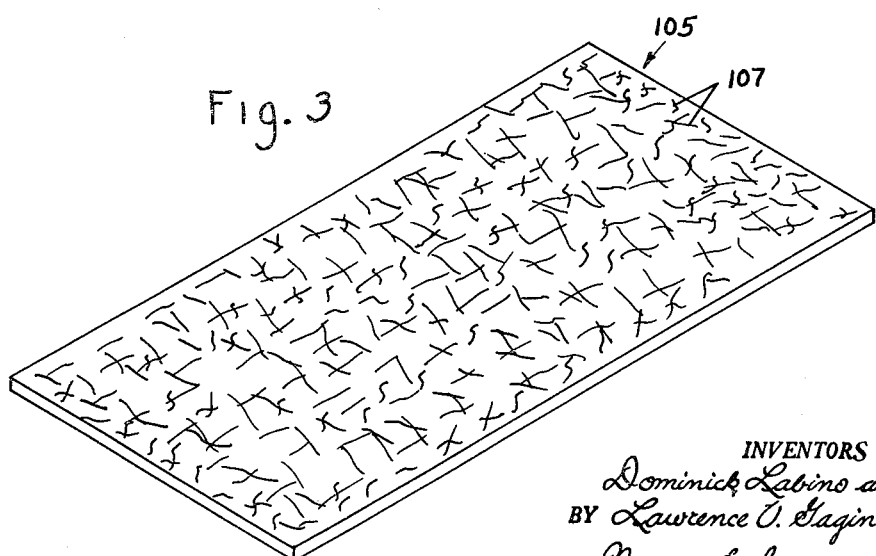
FIG. 3 is a perspective view of a high temperature board-like material made in accordance with the invention.

Thus it will be seen that the apparatus and method hereinabove described is adapted to the production of board-like materials 105 as shown in FIG. 3 which is comprised of a siliceous fibrous base 107 having an inorganic earth-type filler admixed therewith and bonded together with an agent such as colloidal silica or colloidal alumina. As previously stated, the fibers may comprise glass fibers, silica fibers, or an admixture of glass, silica or other fibers, such as alumina fibers or the like. When preparing fibrous admixtures, the different types of fibers can be placed in the slurry tank 60 in weighed amounts from one or a plurality of fiber containers.

The boards can be made to contain a single filler such as talc, clay, flint, feldspar or a mixture of these fillers can be used. In such case, a plurality of hoppers can be used in lieu of the single hopper 82 shown in FIG. 3 or previously admixed filler can be introduced from a single hopper for providing such a filler mixture.

Generally a single binder such as colloidal silica or colloidal alumina is preferably used, however, an admixture of binders may be employed and when so used a plurality of make-up lines can be provided to feed binder ingredients into the supply tank of FIG. 3 whereby binder admixtures can be formed.

Leached fibers having over 90% silica are satisfactory for forming the improved product of the invention and preferred results are obtained when the silica content of the fibers is between about 96 to about 99% silica. Such fibers can be produced by leaching glass fibers having a composition of about 78% silica and about 22% sodium. These fibers will preferably have a diameter of about one micron, but can have diameters in the broad range of 0.3 to 5 microns. These fibers may be produced by the apparatus and process shown in FIG. 1, followed by acid leaching the slurry section of FIG. 3 as above-described These fibers have extremely high fusion points of about 3000° F. and are thereby well adapted to the production of boards which are resistant to extremely high temperatures. However, it is within the scope of the invention to employ leached fibers having a lower silica content than the preferred range of 96% to 99% as set forth above. That is, fibers having a silica content from as low as 50% up to about 100% by weight can be used, depending upon the temperature resistance requirements of the finished boards. The fibers are employed in a broad range of 5 to 50% by weight in the present compositions and in a preferred range between 7 to 30% of the weight of the compositions.

Filler materials applicable to use in the invention include inorganic materials that are stable against decomposition at elevated temperatures, and which are preferably comparatively soft, do not absorb water, and are readily available. The fillers should not contain gas producing materials such as water, which will be evolved when the boards are used, for example, in making cores for casting molten metals. If water were present, the gases evolved would produce voids in the metal castings. However, in applications where gases are not deleterious, gas producing fillers may be used. Thus, fillers which are adapted to use in the present invention include talc, calcined kaolin, powdered silica (flint), feldspar, bauxite, alumina hydrate, mica, gypsum, pyrophyllite, cryolite, barite, witherite, asbestos and calcium silicate. It has been found that the particle size of the filler used is important, i.e., if the filler is too small, it will run through the fibers when the two are wet-felted, whereas if they are too large, they may not become uniformly distributed throughout the felted mat. For these reasons particle sizes for the fillers should be in the range from 80 to 300 mesh, preferably from 80 to 140 mesh based on standard U.S. sieve series. The fillers are employed in a broad range of 5 to 60% by weight in the compositions and in a preferred range between 6 and 45% of the weight of the compositions.

As mentioned above, these fillers should be free of occluded water or materials which produce gases at elevated temperatures when the boards are to be used in applications where gases are objectionable such as when used as cores for the production of metal castings. However, a filler containing water can be used if the boards prior to application of binder are carefully fired to remove such water before being put into use. Of course, where the boards are not to be used for high temperature metal casting, but instead are to be used in insulating applications where minor gas evolutions are of no consequence, fillers containing gas producers may be employed.

The binder employed in the present invention is also an inorganic material capable of withstanding elevated temperatures. Colloidal silica and colloidal alumina are preferred but colloidal aluminum phosphate may also be used. These colloidal binders are suitably suspended in water as a carrier and may contain from about 2 to about 5 pounds of silica per gallon of suspension for convenient application. Commercial colloidal silica containing about 3.2 pounds of silica per gallon of suspension has been satisfactorily employed. The binder is employed in a broad range of 40 to 80% by weight in the compositions and in a preferred range between 50 to 75% of the weight of the compositions.

Complete or partial drying of the felts before the application of the binder thereto is suitably carried out at a low temperature, such as in the range of about 100° to 250° F. However, other temperatures can be employed so long as a desired amount of moisture is removed from the blankets. Thus it is within the scope of the invention to apply binder to a partially or completely dried felt, the latter being employed where maximum take-up of binder is desired. Such drying, if taken to completion does not remove chemically combined water such as contained in silica fibers and where it is desired to have such fibers free of chemically combined water, the felts may be heated at a temperature such as between about 1800 and 2200° F. Such heating is normally sufficient to remove chemically combined water from the silica fibers as well as from a filler containing chemically combined water such as uncalcined clay. The binder treated felts can also be dried in accordance with the foregoing procedure.

The following examples illustrate the production of boards in accordance with the present invention using a variety of fillers separately and in combination and containing varying amounts of fiber, filler and colloidal binder.

EXAMPLE I

Seven pounds of silica fiber of approximately one micron diameter containing 98–99% $SiO_2$ was slurried in about 200 gallons of water and then 7½ pounds of talc, $H_2Mg_3(SiO_2)_4$, containing 63.5 weight percent silica, 31.7 weight percent magnesia (MgO) and 4.8 weight percent of chemically combined water was added to the fiber slurry and admixed therewith by vigorous stirring.

The slurry so formed was felted into a 3 foot by 10 foot blanket and dried and thereafter 8 gallons of Ludox (Du Pont's trademark for colloidal silica) was added to the dried blanket. The Ludox contained 3.2 pounds of silica per gallon. The Ludox treated blanket was then dried at about 100° F. The finished sheet was ⅜" thick by 3 feet wide by 10 feet long and was of a density of 39.5 pounds per cubic foot.

EXAMPLE II

A board was made in accordance with the procedure of Example I wherein 3.5 pounds of quartz fibers, 5 pounds of talc and 6 gallons of Ludox were employed.

EXAMPLE III

A series of runs was made wherein high temperature boards were prepared using silica fibers in combination with fillers including talc, clay, flint and feldspar, separately and in admixture with each other, and colloidal silica as a bonding agent. The percentage of fibers varied from 7.0 to 35.0% by weight, the filler varied from 6.0 to 45% by weight and the colloidal silica varied from 48 to 71.5% by weight. The density of the boards produced varied from 16.5 to 95 pounds per cubic foot and the hardness varied from 1.5 to 3 on the Moh's scale. Compositions of the boards and the rigidity along with other properties such as hardness are presented in the tables below.

Table I

| Run No. | Parts by Weight Used in Slurry | | | | | Part $SiO_2$ from Binder Suspension |
|---|---|---|---|---|---|---|
| | Silica Fiber | Talc | Clay | Flint | Feldspar | |
| 1 | 2 | 12½ | | | | 13.3 |
| 2 | 4 | 10½ | | | | 15.2 |
| 3 | 7 | 7½ | | | | 27.0 |
| 4 | 10 | 4½ | | | | 27.0 |
| 5 | 12 | 2½ | | | | 27.0 |
| 6 | 14½ | | | | | 27.0 |
| 7 | 14½ | | | | | 36.1 |
| 8 | 4 | | | 10½ | | 25.4 |
| 9 | 10 | | | 4½ | | 25.4 |
| 10 | 4 | | | | 10½ | 25.4 |
| 11 | 10 | | | | 4½ | 25.4 |
| 12 | 4 | | 10½ | | | 21.7 |
| 13 | 7 | | 7½ | | | 25.4 |
| 14 | 10 | | 4½ | | | 25.4 |
| 15 | 6½ | | 4 | 4 | | 25.1 |
| 16 | 6½ | 4 | | | 4 | 22.8 |
| 17 | 6½ | 4 | 4 | | | 22.8 |

Table II

| Run No. | Properties of Finished Board | | Finished Board Calculated Composition | | | |
|---|---|---|---|---|---|---|
| | Density (lbs./cu.ft) | Hardness (Moh's scale) | $SiO_2$ | $R_2O_3$ | Alkalies | MgO |
| 1 | 95 | 2–2½ | 83.8 | | | 14.4 |
| 2 | 88 | 2–2½ | 87.0 | | | 11.4 |
| 3 | 53 | 2 | 93.2 | | | 6.5 |
| 4 | 40 | 1½–2 | 95.7 | | | 4.6 |
| 5 | 40 | 1½–2 | 97.3 | | | 3.4 |
| 6 | 16½ | 1–1½ | 99.3 | | | |
| 7 | 25½ | 1½–2 | 99.3 | | | |
| 8 | 52 | 3 | 99.3 | | | |
| 9 | 32 | 1½–2 | 99.3 | | | |
| 10 | 30 | 2–2½ | 91.1 | 5.0 | 3.5 | |
| 11 | 26½ | 1½–2 | 95.9 | 3.5 | 1.5 | |
| 12 | 38 | 2–2½ | 83.8 | 12.0 | | |
| 13 | 30 | 2 | 89.8 | 7.8 | | |
| 14 | 29 | 2 | 93.8 | 4.7 | | |
| 15 | 47 | 2–2½ | 94.0 | 4.0 | | |
| 16 | 46 | 2–2½ | 95.4 | | | 2.8 |
| 17 | 54 | 2–2½ | 90.0 | 4.5 | | 4.3 |

The runs were conducted by mixing the silica fibers and the filler in a mechanical blender to form a slurry. The solids were filtered on a fine screen to partial dryness. The felts so produced were then dried and an aqueous suspension of colloidal silica was added so as to wet the felt thoroughly, and final drying of the boards was done at 110 to 120° F. to prevent migration of the colloidal silica to the surface.

It will be noted that in general the use of more fibers makes a thicker, softer and less dense board and the use of more filler makes a thinner, harder and more dense board. No pressure was applied during felting or drying, but it is obvious that the thickness and density could be varied by pressing the boards during drying. The finished boards all showed good rigidity.

The binder was applied in amounts to obtain a desired rigidity, and it appears that about 50% fibers by weight in the initial felt is best for absorption of the desired amount of binder, and also for making a board porous enough to obtain good uniformity with a reasonable drying time. The very dense boards, such as the one made with two parts of silica fibers and 12½ parts of talc by weight, can be dried rapidly and still maintain uniform density, but as the porosity of the dried felt is increased, slow drying at low temperatures is required to prevent migration of the colloidal silica binder to the surface of the boards.

The calculated oxide compositions of the finished boards is high in silica because of the amount of colloidal silica binder used to obtain the desired rigidity. It would be possible to reduce the silica in boards such as the ones with two and four parts of silica fibers that have 95 and 88 pound densities by reducing the amount of binder.

It appears that the silica range in finished boards could be as low as 70% by weight, with alumina, magnesia, etc. as high as 30%.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. The method of producing a substantially rigid article resistant to high temperatures, which comprises providing an aqueous slurry of siliceous fibers, admixing a granular mineral material with said slurry, forming a felt from said slurry, applying to said felt an aqueous suspension of a colloidal inorganic binder in an amount sufficient to supply from about 40 to about 80% solids by weight, and then drying said felt at a temperature and a time sufficient to prevent migration of the binder to the surface of the felt.

2. A method of producing a temperature-resistant material as defined in claim 1, in which the colloidal inorganic binder is selected from the group consisting of silica, alumina and aluminum phosphate.

3. The method of producing an article resistant to high temperatures as defined in claim 1, in which the siliceous fibers contain in excess of 90% by weight of silica.

4. The method of producing an article resistant to high temperatures as defined in claim 1, in which the siliceous fibers are glass fibers having a silica content in the range from about 50 to about 80 percent by weight.

5. The method of producing an article resistant to high temperatures as defined in claim 1, in which the granular material is selected from the group consisting of the mineral silicates, the silica aluminates, silica, the aluminum hydroxides, the alkali metal and alkaline-earth metal sulfates and the alkaline-earth metal carbonates.

6. A method of producing an article resistant to high temperatures as defined in claim 5, wherein the granular material has a grain size in the range from about 50 to 150 mesh.

7. The method of producing a substantially rigid article resistant to high temperatures, which comprises providing an aqueous slurry of siliceous fibers, admixing with said slurry a granular mineral material in an amount from about 5 to about 90 percent of the weight of said fibers, forming a felt from said slurry, applying to said felt an aqueous suspension of a colloidal inorganic binder in an amount sufficient to supply colloidal solids to said felt in an amount from about 40 to about 80 percent by weight thereof, and drying said felt at a temperature and a time sufficient to prevent migration of the binder to the surface of the felt.

8. A substantially rigid temperature-resistant material comprising a felted mixture of reinforcing silica fibers and granular mineral material, said fibers having in excess of 90 percent by weight of silica, and said granular material being a mineral silicate, said fibers and said granular mineral material being bonded together by a colloidal inorganic binder dispersed uniformly throughout the thickness of the material and selected from the group consisting of silica, alumina and aluminum phosphate said binder being present in an amount between about 40 to about 80% by weight.

9. A substantially rigid temperature-resistant material as defined in claim 8, in which the granular mineral material has a particle size of from about 80 to about 140 mesh based on standard U.S. sieve series.

10. A substantially rigid temperature-resistant material as defined in claim 8, in which the granular material comprises about 5 to 60 percent by weight of the material.

11. A substantially rigid temperature-resistant material, comprising a substantially rigid anhydrous felted body containing the following ingredients by weight.

| Ingredient: | Percent by weight |
|---|---|
| Siliceous fibers | 5–50 |
| Mineral filler | 5–60 |
| Colloidal inorganic binder | 40–80 | said binder being substantially uniformly distributed throughout the thickness of said body.

12. A composition of matter which is resistant to high temperatures, comprising a substantially rigid anhydrous felted body containing the following ingredients by weight.

| Ingredient: | Percent by weight |
|---|---|
| Mineral fibers having in excess of 90 percent by weight of silica | 25–50 |
| Colloidal silica binder | 50–75 | said binder being substantially uniformly distributed throughout the thickness of said body.

13. A composition of matter which is resistant to high temperatures comprising, a substantially rigid anhydrous felted body containing the following ingredients by weight.

| Ingredient: | Percent by weight |
|---|---|
| Mineral fibers containing from about 96 to about 98 percent by weight of silica | 7.0–29.0 |
| Talc [$H_2Mg_3(SiO_2)_4$] | 6.0–35.4 |
| Colloidal silica | 51.0–69.4 | said binder being substantially uniformly distributed throughout the thickness of said body.

14. A composition of matter which is resistant to high temperatures, comprising a substantially rigid anhydrous felted body containing the following ingredients by weight.

| Ingredient: | Percent by weight |
|---|---|
| Mineral fibers containing from about 96 to about 98 percent by weight of silica | 10–25 |
| Flint | 10–25 |
| Colloidal silica | 65 | said binder being substantially uniformly distributed throughout the thickness of said body.

15. A composition of matter which is resistant to high temperatures, comprising a substantially rigid anhydrous felted body containing the following ingredients by weight.

| Ingredient: | Percent by weight |
|---|---|
| Mineral fibers containing from about 96 to about 98 percent by weight of silica | 10–25 |
| Feldspar | 10–25 |
| Colloidal silica | 65 | said binder being substantially uniformly distributed throughout the thickness of said body.

16. A composition of matter which is resistant to high temperatures comprising, a substantially rigid anhydrous felted body containing the following ingredients by weight.

| Ingredient: | Percent by weight |
|---|---|
| Mineral fibers containing from about 96 to to about 98 percent by weight of silica | 17–25 |
| Clay | 11.3–29.0 |
| Colloidal silica | 54–63.7 | said binder being substantially uniformly distributed throughout the thickness of said body.

17. A composition of matter which is resistant to high temperatures comprising, a substantially rigid anhydrous felted body containing the following ingredients by weight.

| Ingredient: | Percent by weight |
|---|---|
| Mineral fibers containing from about 96 to about 98 percent by weight of silica | 16.4 |
| Clay | 10.0 |
| Flint | 10.0 |
| Colloidal silica | 63.6 |
| Total | 100.0 | said binder being substantially uniformly distributed throughout the thickness of said body.

18. A composition of matter which is resistant to high temperatures, comprising a substantially rigid anhydrous felted body containing the following ingredients by weight.

| Ingredient: | Percent by weight |
|---|---|
| Mineral fibers containing from about 96 to about 98 percent by weight of silica | 17.4 |
| Talc | 10.5 |
| Flint | 10.5 |
| Colloidal silica | 61.6 |
| Total | 100.0 | said binder being substantially uniformly distributed throughout the thickness of said body.

19. A composition of matter which is resistant to high temperatures, comprising a substantially rigid anhydrous felted body containing the following ingredients by weight.

| Ingredient: | Percent by weight |
|---|---|
| Mineral fibers containing from about 96 to about 98 percent by weight of silica | 17.5 |
| Talc | 10.5 |
| Clay | 10.5 |
| Colloidal silica | 61.5 |
| Total | 100.0 | said binder being substantially uniformly distributed throughout the thickness of said body.

20. A method of producing a temperature resistant article, comprising forming an aqueous slurry of siliceous fibers, forming a fibrous felt from said slurry, drying the felt, thoroughly wetting the felt with an aqueous suspension of a colloidal inorganic binder in an amount sufficient to supply from between about 40% to about 80% by weight solids, and drying the binder containing felt at a temperature and time sufficient to prevent migration of binder to the surface of said felt.

References Cited in the file of this patent

UNITED STATES PATENTS

| 2,444,347 | Greger et al. | June 29, 1948 |
| 2,493,604 | Walters | Jan. 3, 1950 |
| 2,555,506 | Powers | June 5, 1951 |
| 2,561,362 | Guillot | July 24, 1951 |
| 2,695,549 | Quinn | Nov. 30, 1954 |
| 2,730,475 | Parker | Jan. 10, 1956 |

UNITED STATES PATENT OFFICE
CERTIFICATE OF CORRECTION

Patent No. 3,017,318                                               January 16, 1962

Dominick Labino et al.

It is hereby certified that error appears in the above numbered patent requiring correction and that the said Letters Patent should read as corrected below.

Column 6, line 22, after "above-described" insert a period; column 8, Table II, column 7, line 16, thereof, for "2.8" read -- 3.6 --.

Signed and sealed this 1st day of May 1962.

(SEAL)
Attest:

ERNEST W. SWIDER
Attesting Officer

DAVID L. LADD
Commissioner of Patents